United States Patent [19]
Yamamasu et al.

[11] Patent Number: 5,110,541
[45] Date of Patent: May 5, 1992

[54] METHOD OF MANUFACTURING ELECTRODES OF MOLTEN CARBONATE FUEL CELL

[75] Inventors: Yoshikazu Yamamasu, Yokohama; Tetsuyuki Morita, Tokyo; Sadao Nakaniwa, Yokohama; Masami Ichihara, Yachiyo, all of Japan

[73] Assignee: Ishikawajima-Harima Heavy Industries Co., Ltd., Tokyo, Japan

[21] Appl. No.: 703,929

[22] Filed: May 22, 1991

[30] Foreign Application Priority Data

May 28, 1990 [JP] Japan .................................. 2-135360

[51] Int. Cl.$^5$ ............................................. G22F 1/00
[52] U.S. Cl. ........................................ 419/2; 419/33; 419/36; 419/40; 419/57
[58] Field of Search ................. 419/2, 33, 36, 40, 57

[56] References Cited

U.S. PATENT DOCUMENTS 4,206,271  6/1980  Norling et al. .................. 419/25
4,386,040  5/1983  Baumgartner et al. ............. 419/2

Primary Examiner—Stephen J. Lechert, Jr.
Attorney, Agent, or Firm—Trexler, Bushnell, Giangiorgi & Blackstone, Ltd.

[57] ABSTRACT

A method of manufacturing a porous electrode for a molten carbonate fuel cell comprises the steps of: pulverizing an Al-base intermetallic compound; mixing Ni powders with the pulverized intermetallic compound to form a slurry which contains Ni powders and the pulverized intermetallic compound, the pulverized intermetallic compound serving as a reinforcement; shaping the slurry like a sheet or a tape; and sintering the sheet or tape-like slurry to form the porous electrode.

14 Claims, 2 Drawing Sheets

METHOD OF MANUFACTURING ELECTRODES OF MOLTEN CARBONATE FUEL CELL

BACKGROUND OF THE INVENTION

1. Technical Field

The present invention relates to a method of manufacturing an electrode of a molten carbonate type fuel cell.

2. Background Art

A lot of fuel cell systems have been developed and a molten carbonate fuel cell is one of typical fuel cells. A conventional molten carbonate type fuel cell includes an electrolyte plate (tile) soaked with molten carbonate, a cathode (oxygen electrode) and an anode (fuel electrode). The cathode electrode and the anode electrode sandwich the electrolyte plate. Oxidizing gas is fed to the cathode electrode and fuel gas is fed to the anode electrode to produce a potential difference between the two electrodes. Generally, a plurality of sets of electrolyte plate, cathode electrode and anode electrode are stacked one after another via separators.

One of the manufacturing methods of green tapes of electrode is a tape casting method using a doctor blade. The tape casting method is a continuous producing method so that it is suitable for a manufacturing of large electrodes and a mass production of the green tapes of electrode. The tape casting method is also preferable to form electrodes of homogeneous thickness.

With the tape casting method using the doctor blade, the electrode is manufactured as follows: Raw material powders, a dispersant and an organic solvent are mixed by a ball mill until the raw material powders are dispersed to primary particles. Then, a binder and a plasticizer are added to the primary particles and mixed with each other until they become slurry. The slurry is casted to a tape-like (sheet-like) substance by the doctor blade. The tape-like substance is then dried to a green tape and the green tape is sintered to a porous electrode.

There are four types of raw material powder used in the above-described method. Those are: (i) Ni powders only; (ii) Ni-Cr or Ni-Al alloy powders; (iii) Ni powders and Cr powders (Cr content is 1 to 10%); and (iv) Ni and oxides (for example, $Al_2O_3$). These powders, however, have following disadvantage respectively:

(i) Ni powders

When an electrode is made from Ni powders only, the electrode has a low anti-creep strength since the electrode consists of a single substance. The electrode, therefore, is easy to deform during the operation of the fuel cell;

(ii) Ni-Cr or Ni-Al alloy powders

It is difficult to manufacture fine powders of the alloy using the atomizing method, though the electrode needs to consist of fine particles or grains in order to obtain a desired microstructure. The sintering process, moreover, needs to include an oxidizing step and a reducing step, to obtain a suitable microstructure, as long as the atomizing method is employed. With this method, the cost of the manufacturing of the raw alloy powders and the cost of sintering of the electrode are high;

(iii) Ni powders and Cr powders (Cr content is 1 to 10%)

The Ni powders and the Cr powders are segregated, even though the Ni and Cr powders are mixed and sintered; and (iv) Ni and oxides (e.g. $Al_2O_3$)

After the tape casting, the oxides tend to be segregated on an upper layer of the tape because of the large difference of density between the Ni powders and the oxide powders.

It should be noted that the powders are likely to be segregated because of the difference of the densities of the powders (The density of Ni is 8.89 $g/cm^3$; Cr is 7.19 $g/cm^3$; oxides is 2-4 $g/cm^3$; and Al-intermetallic compound is 3-6 $g/cm^3$).

Meanwhile, it is generally said that a microstructure of the electrode needs to be stable in order to improve the performance of the fuel cell. The microstructure, however, changes with the creep deformation of the electrode. Therefore, Cr is added, as the powders of (ii) and (iii), to improve a creep strength of the electrode. However, even though Cr is added 8 to 10%, the electrode is deformed by the creep and the microstructure of the electrode is changed. More specifically, in case of (iii), the Cr powders mixed with the Ni powders dissolve into Ni powders during the sintering, and the Cr changes into Cr oxide on the Ni-Cr alloy under the MCFC condition, which reinforces the anode electrode. Generally, it is necessary to add 8-10 wt. % of Cr in the electrode to improve the anti-creep strength of the electrode, and more Cr would be added to reinforce the electrode more. However, it is not recommended to add a large amount of Cr since the Ni-Cr alloy is lithiated and consumes the carbonate during the power generation. In addition, in case of (iv), the $Al_2O_3$ powders dispersed into the Ni powders reinforces the anode electrode as mentioned before. However, it is not easy to sinter $Al_2O_3$ and Ni together. Even if pure Al powders are added to the Ni powders, the Al powders are easy to be oxidized into $Al_2O_3$ during the sintering and then Al does not dissolve into Ni.

SUMMARY OF THE INVENTION

On the of the objects of the present invention is to provide a method of manufacturing a fuel cell electrode which has an improved creep strength and whose microstructure is stable.

Another object of the present invention is to provide a method of manufacturing a fuel cell electrode in which elements of the alloy are not segregated.

Still another object of the present invention is to provide a method a manufacturing a fuel cell electrode in which $Al_2O_3$ or Al is indirectly added to reinforce an electrode of the fuel cell.

Yet another object of the present invention is to provide a method of manufacturing a fuel cell electrode which does not have a problem of segregation of powders.

According to one aspect of the present invention, there is provided a fuel cell electrode manufacturing method characterized in that the fuel cell electrode is produced from the mixture of Ni powders and the powders of intermetallic compound consisting of Al and other metals, to be reinforced. This method includes following steps: The Ni powders and the Al-base intermetallic powders are mixed together to be slurry; The slurry is casted using the doctor blade and shaped like a tape or a sheet; The sheet is dried to be a green tape; and The green tape is sintered to be a porous electrode.

Since the density of the intermetallic compound consisting of Al and other metals is lower than the density of Ni, the Ni powders and the powders of the intermetallic compound are segregated if no measures are taken. In the present invention, therefore, the slurry is stirred during the tape casting to avoid the segregation.

Since the intermetallic compound solves into Ni during the sintering, which reinforces the electrode, the microstructure depends on the composition of the intermetallic compound, the percentage of the intermetallic compound and the size of the particles of the intermetallic compound. It is, therefore, possible to control the microstructure of the electrode by the intermetallic compounds.

in order to add $Al_2O_3$ or Al indirectly to reinforce the anode electrode of the fuel cell, following two additives are preferred: (1) Al-intermetallic compound and (2) Al-alloy.

As to Al-intermetallic compound, it was found that the sintering of Ni powders with the powders of intermetallic compounds consisting Al and other metals which dissolve into Ni is relatively easy. In addition, since Al-intermetallic compounds are hard and fragile (brittle), it is easy to produce fine powders of Al-intermetallic compound. Therefore, we developed a method of manufacturing the anode electrode which includes the step of adding Al-intermetallic compound. The anode electrode consisting of about 1–4 wt. % of Al-intermetallic compound is 2–3 times stronger against the creep than the anode electrode constituted by about 8–10 wt. % of Cr. Moreover, since the density of Al-Cr intermetallic compound, for example, is 40–60% of the density of Cr, the volume or the number of the particles of the Al-Cr intermetallic compound is larger than the volume or the number of the Cr powders, if the same amount of Cr is added to the anode electrode. Thus, the powders of Al-Cr intermetallic compound and Ni can be mixed uniformly more easily than the powders of Cr and Ni.

As to Al-alloy, if the Al-alloy is used with the atomizing method, the electrode manufacturing process should include the oxidizing step and the reducing step, as described above. Therefore, another novel process should be employed when Al-alloy is used and such a process is disclosed in the following detailed description.

In order to prevent the segregation of the powders of Al-intermetallic compound in the mixture of the Ni powders, a method of the present invention includes a step of stirring the slurry of the mixture of Ni and Al-intermetallic compound in the tank slowly during the tape casting.

DESCRIPTION OF THE PREFERRED EMBODIMENTS

A preferred embodiment of the present invention will be described with reference to the accompanying drawings.

Figure 1:
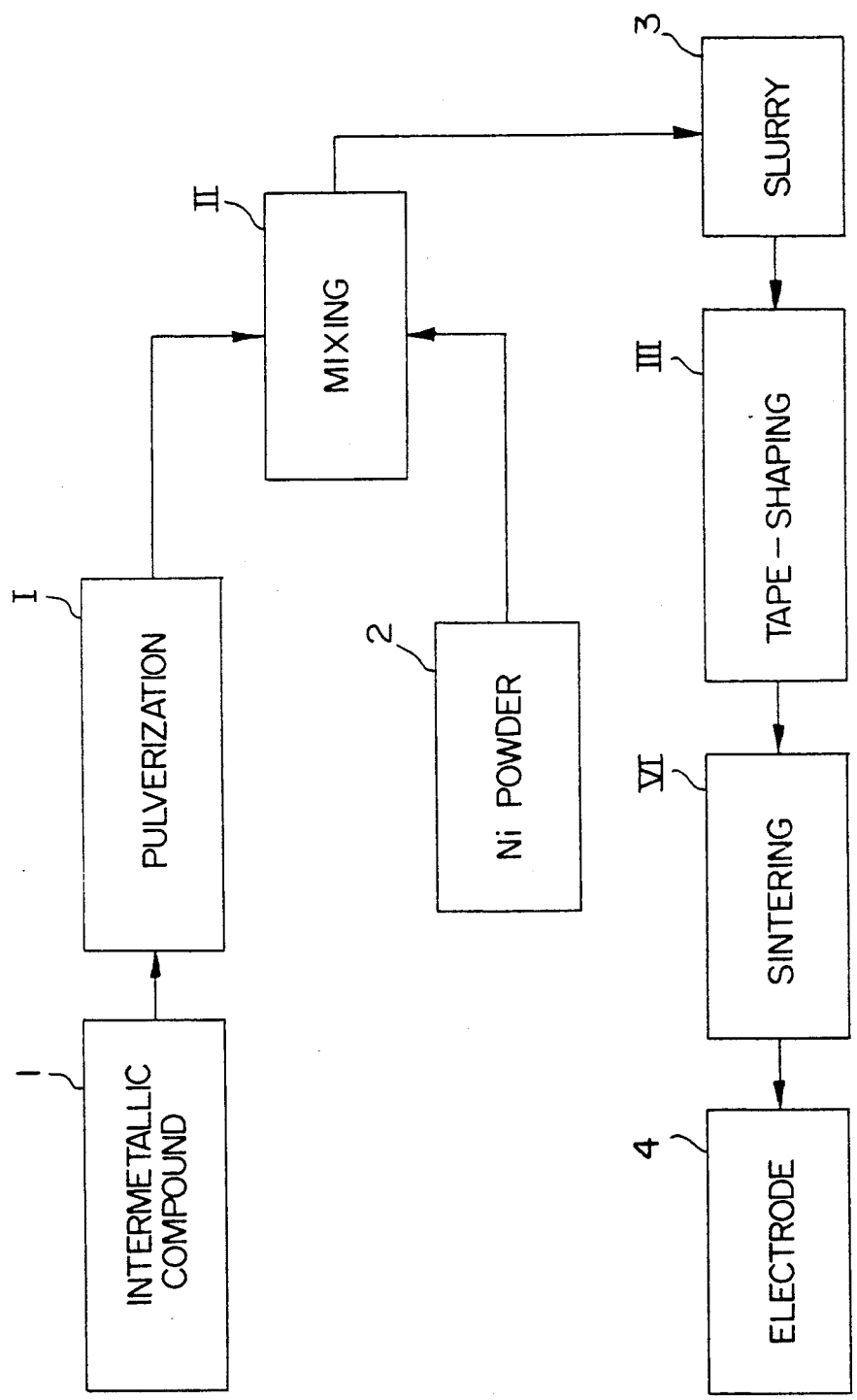
FIG. 1 shows a process of manufacturing a fuel cell electrode according to the present invention.

Referring to FIG. 1, I designates a pulverizing step of intermetallic compound 1, II designates a mixing step of the pulverized intermetallic compound 1 and Ni powders 2, III designates a tape casting step in which a slurry 3 obtained after the mixing step II is made to a tape-like substance and dried to be a green tape and IV designates a sintering step in which the green tape obtained in the step III is sintered to an electrode 4. These steps are explained in depth below.

Metals are melted together in a predetermined composition and cooled to be a metallic compound. The metallic compound is crushed by a hammer mill or a ball mill at the pulverizing step I. Or in another method, the metals are melted together and cooled by a gas-atomizing method, to be formed into intermetallic compound powders whose diameter is 50–100 micrometers. The intermetallic compound powders are atomized by the ball mill at the pulverizing step I, to be powders whose diameter is about 0.5–10 micrometers (5 micrometers in average).

An intermetallic compound, for example, 50Ni-25Cr-25Al is prepared as the intermetallic compound 1. The compound 1, which serves as a reinforcement, is added (about 0.5 to 10 wt. % in the electrode) to the raw Ni powders 2 (the grain diameter of the Ni powder is about 2–20 micrometers; carbonyl nickel powders of INCONEL). The Ni powders and the Al-base intermetallic powders are mixed together with a binder (3–5 wt. %; methyl cellulose) and solvent (1.5 times of the powders in weight; e.g. water) at the mixing step II, to form the slurry 3. The viscosity is 2,000–5,000 cps, which is suitable for the tape casting using the doctor blade.

The slurry 3 is tape-casted to be a sheet-like substance using the doctor blade at the tape casting step III. The sheet-like substance is dried continuously after the casting to be a green tape. The green tape is sintered at approximately 1,000–1,100 degrees C. for 0.5–1.0 hour in a vacuum or a reducing atmosphere at the sintering step IV, to be the porous anode (electrode) 4. The porous electrode 4 is 0.5–1.5 mm in thickness, the porosity of the electrode 4 is 50–60% and the means pore diameter of the pore of the electrode 4 is 4–8 microns.

It should be noted here that the intermetallic compound 1 may have following compositions: Al-Ni compounds ($Ni_3Al$, $Ni_2Al_3$, AlNi); Al-Fe compounds ($Al_2Fe$, $Al_3Fe$, AlFe); Al-Co compounds (AlCo, $Al_5Co$, $Al_9CO_2$); Al-Cr compounds ($AlCr_2$, $Al_4Cr$, $Al_9Cr_5$, $Al_9Cr_4$); Al-Ti compounds (AlTi, $Al_3Ti$).

Since the density of the intermetallic compound 1 is higher than the density of the oxide, the segregation of the compound is smaller than the segregation of the oxide, after the intermetallic compound 1 is mixed with the Ni powders 2.

For the intermetallic compound consisting of Cr, this method has several other advantages: It is possible to add smaller amount of Cr when Cr is provided by Al-Cr intermetallic compound powder than when Cr is provided by pure Cr powder; It is possible to sinter the electrode in a single step, though it is necessary to sinter the electrode consisting of Ni-Cr alloy in two steps (the oxidization step and the reduction step).

Since the intermetallic compound 1 dissolves into Ni powder during the sintering, to reinforce the electrode against the creep as the dispersed oxide, the present invention can improve the creep strength of the electrode. Moreover, the creep strength of the electrode improved by the present invention is equivalent or greater than the creep strength of the electrode consisting of Ni and 8–10 weight percent of Cr, though the percentage of the Cr in the electrode constituted by the intermetallic compound 1 is smaller. Therefore, the electrode constituted by the intermetallic compound 1 is more stable, and it is possible to control the microstructure of the electrode.

A table below shows results of typical compression creep test conducted to the electrodes to which the Al base intermetallic compound as added. For comparison with a conventional electrode, data of the Ni-8% Cr electrode ares also shown in the table. The creep test condition were as follows: 700° C. for 50 hours with a compression load of 15.4 kgf/cm$^2$ in 80% H$_2$-20% CO$_2$ (60° C. H$_2$O saturated). The table does not show the Al-Co compound, but same results as Al-Cr compound were obtained in the experiments. In the column of "relative creep strength", a value higher than one indicates that its creep strength is higher than Cr.

Figure 2:
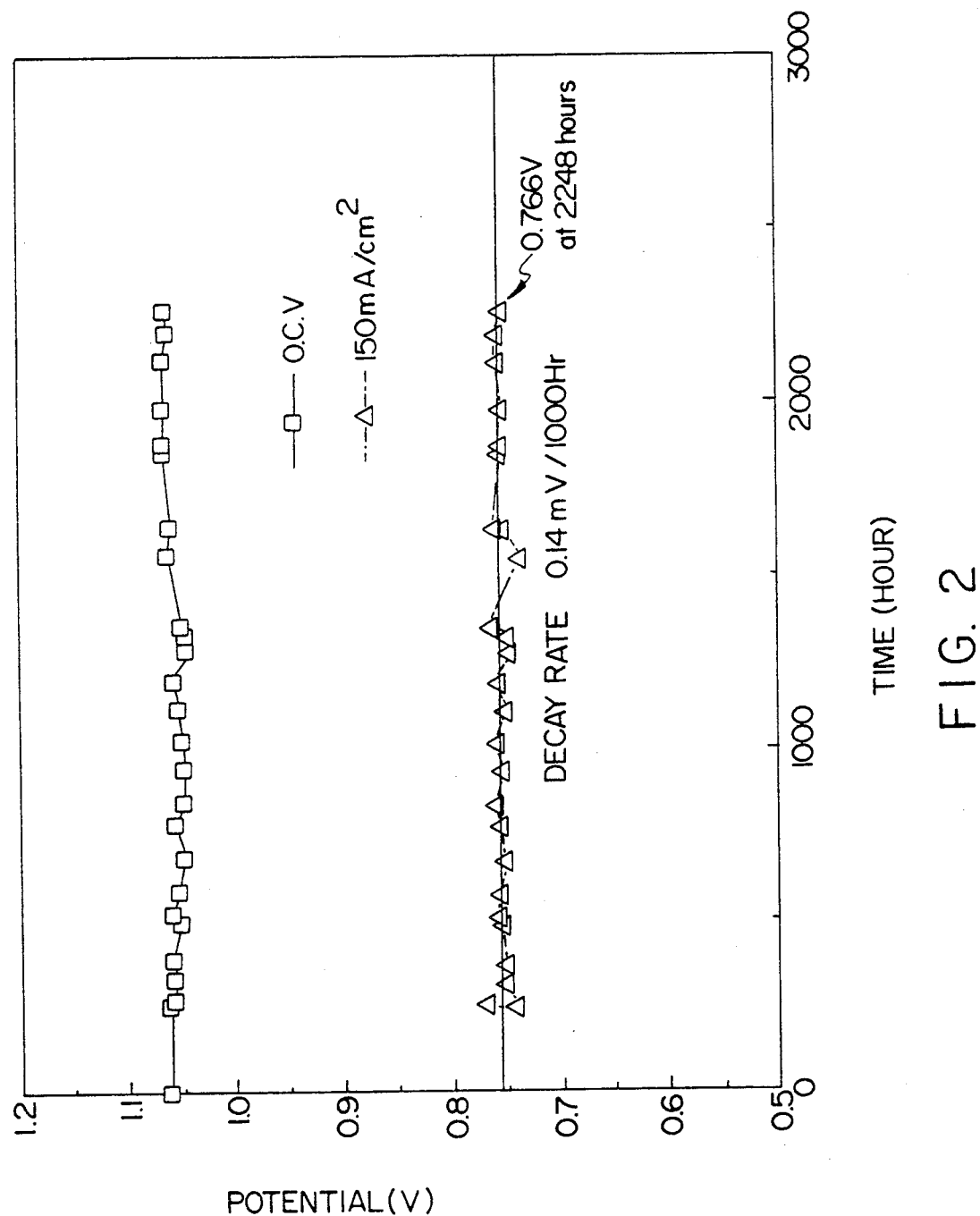
FIG. 2 is a diagram showing a fuel cell performance which has an electrode improved by the present invention.

The creep strength of electrode strongly depends on the particle size of Al base intermetallic compound and the porosity of electrode. FIG. 2 shows a result of cell test using the Ni-2% (Al-Cr: Al$_9$Cr$_4$) anode. The decay rate of this cell is very slow.

TABLE

| COMPOSITION OF ADDITIVES | AMOUNT TO BE ADDED (Wt %) | CREEP DEFORMATION | RELATIVE CREEP STRENGTH |
|---|---|---|---|
| Cr | 8% | 11.5% | 1.0 |
| Al$_9$—Cr$_4$ | 1% | 3.2% | 3.57 |
| | 2% | 2.3% | 5.00 |
| | 4% | 1.5% | 7.69 |
| AlCr$_2$ | 1% | 5.5% | 2.08 |
| | 5% | 2.0% | 5.88 |
| Al$_3$Ti$_2$ | 3% | 4.2% | 2.78 |
| AlTi | 2% | 5.3% | 2.17 |
| Ni$_3$Al | 10% | 6.8% | 1.79 |
| Al$_3$Ni | 6% | 7.2% | 1.59 |
| Al$_2$Fe | 4% | 7.2% | 1.59 |
| AlFe$_3$ | 6% | 6.8% | 2.00 |

What is claimed is:

1. A method of manufacturing a porous electrode for a molten carbonate fuel cell, comprising the steps of:
   (A) pulverizing an Al-base intermetallic compound;
   (B) mixing Ni powders with the pulverized Al-base intermetallic compound to form a slurry which contains Ni powders and the pulverized intermetallic compound in a manner such that the pulverized intermetallic compound serves as a reinforcement;
   (C) shaping the slurry like a sheet or a tape; and
   (D) sintering the sheet or tape-like slurry to form the porous electrode.

2. The method of claim 1, wherein in the step (A) the pulverized intermetallic compound is prepared by melting and alloying certain metals and then pulverizing the alloy until a diameter of individual powder becomes about 0.5 to 10 micrometers.

3. The method of claim 2, wherein the pulverized intermetallic compound of about 0.5 to 10 wt. % relative to the Ni powders are mixed with the Ni powders in the step (B).

4. The method of claim 1, wherein water whose weight is approximately 1.5 times a weight of a mixture of the pulverized intermetallic compound and the Ni powders is added to the mixture of the pulverized intermetallic compound and the Ni powders in the step (B).

5. The method of claim 1, wherein binder and water whose weight is approximately 1.5 times a weight of a mixture of the pulverized intermetallic compound and the Ni powders are added to the mixture of the pulverized intermetallic compound and the Ni powders in the step (B).

6. The method of claim 1, wherein the step (D) is performed under a temperature between about 1,000 and 1,100 degrees C.

7. The method of claim 1, wherein the step (A) is performed using a hammer mill or a ball mill.

8. The method of claim 1, further including the step of drying the slurry after step (C) and before the step (D).

9. The method of claim 6, wherein the step (D) is performed in an atmosphere containing reducing gas.

10. The method of claim 1, wherein the slurry is shaped like a sheet or a tape having a thickness of about 0.5 to 1.5 mm using a doctor blade in the step (C).

11. The method of claim 1, wherein the intermetallic compound is Al-Ni type intermetallic compound such as selected from the group consisting of AlNi, Ni$_3$, Al, Ni$_2$Al$_3$, Al$_2$Fe, Al$_3$Fe, AlFe, AlCo, Al$_5$Co, Al$_9$Co$_2$, AlCr$_2$, Al$_4$Cr, Al$_8$Cr$_5$, Al$_9$Cr$_4$, AlTi, and Al$_3$Ti.

12. The method of claim 1, wherein a diameter of Ni powder is between about 2 and 10 micrometers.

13. The method of claim 1, wherein the slurry includes binder of 3 to 5 wt. % such as methyl cellulose.

14. The method of claim 1, wherein the step (D) is performed in a manner such that the porous electrode obtained after the step (D) has a porosity of about 50 to 60% and an average hole diameter of about 4 to 7 micrometers.

* * * * *